(12) United States Patent
Martini

(10) Patent No.: US 8,147,780 B2
(45) Date of Patent: Apr. 3, 2012

(54) RECOVERY OF LEAD IN FORM OF HIGH PURITY LEAD CARBONATES FROM SPENT LEAD BATTERIES INCL. ELECTRODE PASTE

(75) Inventor: Federica Martini, Spinea (IT)

(73) Assignee: Millbrook Lead Recycling Technologies Limited, Dublin (IE)

( * ) Notice: Subject to any disclaimer, the term of this patent is extended or adjusted under 35 U.S.C. 154(b) by 72 days.

(21) Appl. No.: 12/523,096

(22) PCT Filed: Jan. 15, 2008

(86) PCT No.: PCT/IT2008/000022
§ 371 (c)(1),
(2), (4) Date: Oct. 2, 2009

(87) PCT Pub. No.: WO2008/087684
PCT Pub. Date: Jul. 24, 2008

(65) Prior Publication Data
US 2010/0034715 A1 Feb. 11, 2010

(30) Foreign Application Priority Data
Jan. 17, 2007 (IT) .............................. VA2007A0007

(51) Int. Cl.
*C01G 21/00* (2006.01)
(52) U.S. Cl. ................ 423/92; 423/93; 423/95; 423/98; 423/435; 423/559; 423/619; 422/224; 422/225
(58) Field of Classification Search .................... 423/92, 423/93, 95, 98, 435, 619, 559; 422/224, 422/225
See application file for complete search history.

(56) References Cited

U.S. PATENT DOCUMENTS
2,152,242 A * 3/1939 Curtin .............................. 423/95
(Continued)

FOREIGN PATENT DOCUMENTS
EP 1619261 A1 1/2006
(Continued)

OTHER PUBLICATIONS
Written Opinion for PCT/IT2008/000022, Jul. 21, 2009.*

*Primary Examiner* — Steven Bos
(74) *Attorney, Agent, or Firm* — Connolly Bove Lodge & Hutz LLP

(57) ABSTRACT

Wet process of low environmental impact recovers the lead content of an electrode slime and/or of lead minerals in the valuable form of high purity-lead carbonates that are convertible to highly pure lead oxide by heat treatment in oven at relatively low temperature, perfectly suited for making active electrode pastes of new batteries or other uses. The process basically comprises the following steps: a) adding sulphuric acid to a different acid leach suspension of the starting impure material for converting all dissolved lead compounds to insoluble lead sulphate; b) separating the solid phase constituted by lead sulphate and undissolved impurities from the acid leach solution; c) selectively dissolving lead sulphate contained in said separated solid phase in an aqueous solution of a lead solubilizing compound comprising preferably sodium acetate; d) separating the solution containing dissolved lead sulphate from the solid phase residue including undissolved impurities; e) adding to the separated solution of lead sulphate a carbonate of the same cation of said dissolving compound for forming insoluble lead carbonate and/or and lead oxycarbonate and a dissolved sulphate of the same cation; f) separating the precipitated carbonate and/or oxycarbonate of lead from the dissolving solution now containing also sulphate of the cation of said solubilizing compound.

18 Claims, 2 Drawing Sheets

U.S. PATENT DOCUMENTS

| | | | |
|---|---|---|---|
| 2,187,749 A * | 1/1940 | Marvin | 423/95 |
| 4,220,628 A | 9/1980 | Striffler, Jr. et al. | |
| 4,269,811 A | 5/1981 | Striffler, Jr. et al. | |
| 4,769,116 A | 9/1988 | Olper et al. | |
| 5,127,963 A | 7/1992 | Hartup et al. | |

FOREIGN PATENT DOCUMENTS

| | | |
|---|---|---|
| GB | 2183623 A | 6/1987 |
| WO | WO-01/21846 A1 | 3/2001 |
| WO | WO-2005/007904 A1 | 1/2005 |

* cited by examiner

US 8,147,780 B2

RECOVERY OF LEAD IN FORM OF HIGH PURITY LEAD CARBONATES FROM SPENT LEAD BATTERIES INCL. ELECTRODE PASTE

CROSS REFERENCE TO RELATED APPLICATIONS

This application is a national phase of PCT/IT2008/000022, filed on Jan. 15, 2008 which claims priority to VA2007A000007 filed Jan. 17, 2007, the entire contents of all are hereby incorporated by reference.

BACKGROUND OF THE INVENTION

Valuable high purity lead compound and eventually metallic lead is obtained from minerals as well as from electrode paste or slime recovered from dismissed lead batteries by pyrometallurgy according either to a very high temperature (1500-1700° C.) process with attendant generation of large quantities toxic fumes to be abated, or to a high temperature (1000-1100° C.) process, as often practiced in case the starting material is recovered electrode paste, that implies a significant by-production of toxic slags to be disposed of as dangerous substances in special dumps.

An attempt to improve these situations has been pursued through a carbonation technique of the raw (impure) electrode paste in plants for producing secondary lead.

This technique gives substantial advantages in terms of reduced impact on the environment but poor economical results and therefore has not encountered diffused acceptance in the industry. Many have endeavoured to improve the performance of this technique as testified by the numerous patent publications such as: U.S. Pat. No. 5,827,347, also published as WO9966105; U.S. Pat. No. 5,840,262 also published as WO9858878; the European Patents No. 1619261, No. 1656463; the Italian Patent No. 01239001; the U.S. Pat. No. 4,336,236 and No. 1,738,081; the BP patents No. 239,257 and No. 272,053; the Belgian Patents No. 273,660 and No. 691, 028 as well as the project "Cleanlead Gypsum" partially finanaciated by the European Union.

Lead is extracted from a lead mineral such as galena, through a high temperature (over 1500° C.) pyro-metallurgical process that produces impure lead. All sulphur present in the starting material is converted to $SO_2$ such that generally to the pyrometallurgical plant is associated a plant for producing sulphuric acid in order to avoid inertization of $SO_2$ in the form of $CaSO_4$, which has an extremely low commercial value.

OBJECTIVES AND SUMMARY OF THE INVENTION

It has now been found and is the object of the claimed invention a wet process that achieves a practically complete conversion of the lead content of recovered electrode paste or slime from dismissed lead batteries, typically a grossly impure mixture of dioxide, sulphate and oxysulphate of lead that compose the electrode paste of a battery and/or of a lead mineral, to carbonate and/or oxycarbonate of lead of very high purity.

The obtained high purity lead carbonate mixture may be eventually converted through a relatively low temperature heat treatment in oven to lead oxide of extremely high purity, above 99.9%, which is perfectly suitable to be directly reused for preparing electrode pastes of new batteries.

Of course, the mixture of highly pure carbonate and oxycarbonate of lead that is produced may even be employed as starting material for producing other useful lead compounds or for producing metallic lead by thermal reduction or electrolysis.

The basic operations contemplated by the novel process of this invention are all performed in aqueous suspension or solution at atmospheric pressure, with indoubtable advantages from the point of view of reduced energy consumption and reduced environmental impact. Moreover, only simple apparatuses of generally common use in the chemical industry, such as for example stirred reactors, dosing pumps, filters and crystallizers are needed.

The reagents required by the process are:
a) an acid different from sulphuric acid capable of dissolving lead oxide;
b) hydrogen peroxide or alternatively sulphurous anhydride or a sulphite to reduce lead dioxide if it is present in the starting material, as for example in the case of electrode paste or slime according to one of the commonly used techniques to form lead sulphate;
c) sulphuric acid for converting dissolved lead compounds to insoluble sulphates;
d) a water soluble compound capable of selectively dissolving lead sulphate in respect to other insoluble sulphates;
e) a water soluble carbonate salt for forming insoluble lead carbonate and a water soluble sulphate of the cation of the carbonate salt employed.

Besides producing lead carbonate and/or oxycarbonate, the process produces as by-product sulphate of the cation of the carbonate salt employed for precipitating lead carbonates. The sulphate salts that remain in solution may all be separately recovered at high purity and may be easily commercialized in a remunerative manner on the market.

According to a first preferred embodiment of the process of this invention, particularly suitable for treating raw recovered electrode paste or slime, the impure material is subjected to the following steps directly without any pyrometallurgical pre-treatment:

1) acid leaching of the impure material employing an acid different from sulphuric acid and capable of forming soluble salts of Pb(II) such as for example acetic acid, nitric acid, fluo-boric acid and fluo-silicic acid;
2) addition to the acid leach suspension of hydrogen peroxide or of sulphurous anhydride or of a sulphite for reducing the undissolved lead dioxide to soluble compounds of Pb(II) which dissolve in the acid leach solution or for forming insoluble lead sulphate;
3) addition of sulphuric acid to the acid leach suspension for reacting with dissolved Pb(II) contained in the acid leach solution forming insoluble lead sulphate;
4) separation of the solid phase of the sulphatated suspension constituted by lead sulphate and of undissolved impurities of the starting material, recovery of the clarified acid leach solution, reconstituted by the preceding sulphatation step and eventual recycling of the acid solution to step 1);
5) treatment of the separated solid phase with an aqueous solution containing compounds capable of selectively dissolving the sulphate, as for example sodium acetate, ammonium acetate, potassium acetate, acetates of urea, mono-, di-, tri-ethanol amine, methyl, ethyl, propyl amine and of other amines and hydrosoluble ammides, sodium tiosulphate;
6) separation of a clear solution from the undissolved solid residues now constituted by only the impurities present in the starting impure material;
7) addition to the clear solution containing lead sulphate dissolved in the solubilizing solution of a carbonate (for example carbonate of sodium or of potassium or of ammonium) for precipitating insoluble lead carbonate and/or oxycarbonate and forming correspondent soluble sulphate of the cation of the carbonate salt employed in the solubilizing solution;
8) separation of the lead carbonates from the solution;
9) controlled cooling or heating of the clear solution for selectively crystallizing and separating sulphate of the cation of the carbonate salt used in the solubilizing solution and eventual recycling of the clear solution to step 5).

The so recovered mixture of lead carbonates and the sulphate of the cation of the carbonate salt used have both a high level of purity. The lead carbonates separated from the solution may be commonly converted to lead oxide and $CO_2$ by heating in oven at a relatively low temperature without adding any reagent. The lead oxide that is obtained has a purity in excess of 99.9% (normally higher than 99.99%) and may be used directly for preparing new batteries.

In case the starting material is a lead mineral or a mixture of minerals, if the starting material contains only acid leachable compounds of Pb(II), the process remains substantially identical to the one illustrated above for the case of presence of insoluble lead dioxide in the starting material (e.g. electrode slime), eliminating only step 2); differently, if the minerals contains only lead sulphate, the process obviously may start from step 5).

When starting from minerals that generally include a far larger proportion of impurities than a raw recovered electrode slime, there will be a larger residue left from the solubilization of lead sulphate. However, such a solid phase residue may be processed for extracting other metals contained in the mineral from a now more concentrated source having already extracted the lead content.

DESCRIPTION OF EMBODIMENTS OF THE INVENTION

Figure 1:
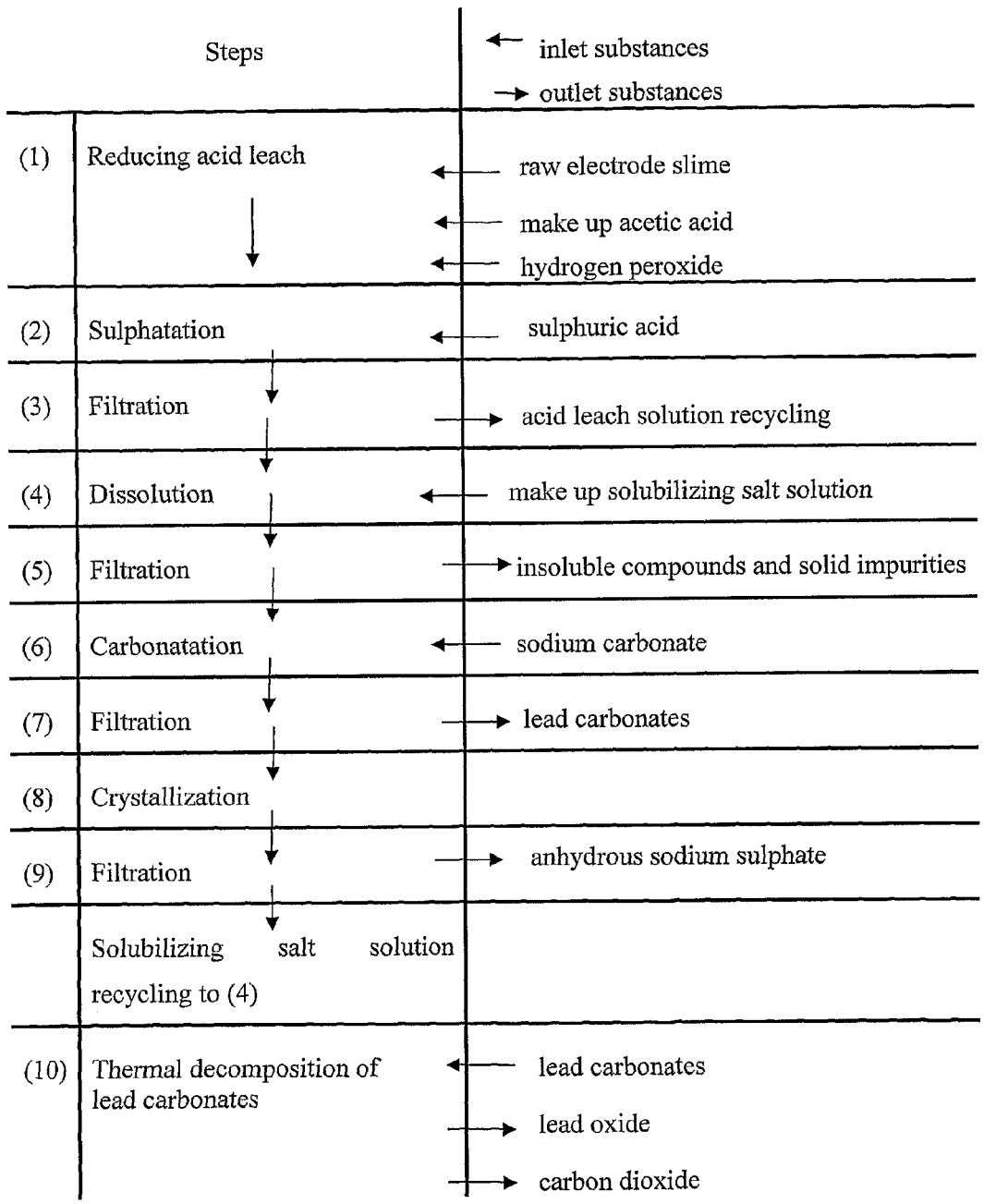
FIG. 1 is a flow chart of the main steps of a process for the recovery of lead carbonates from battery electrode slime according to a preferred embodiment.
Figure 2:
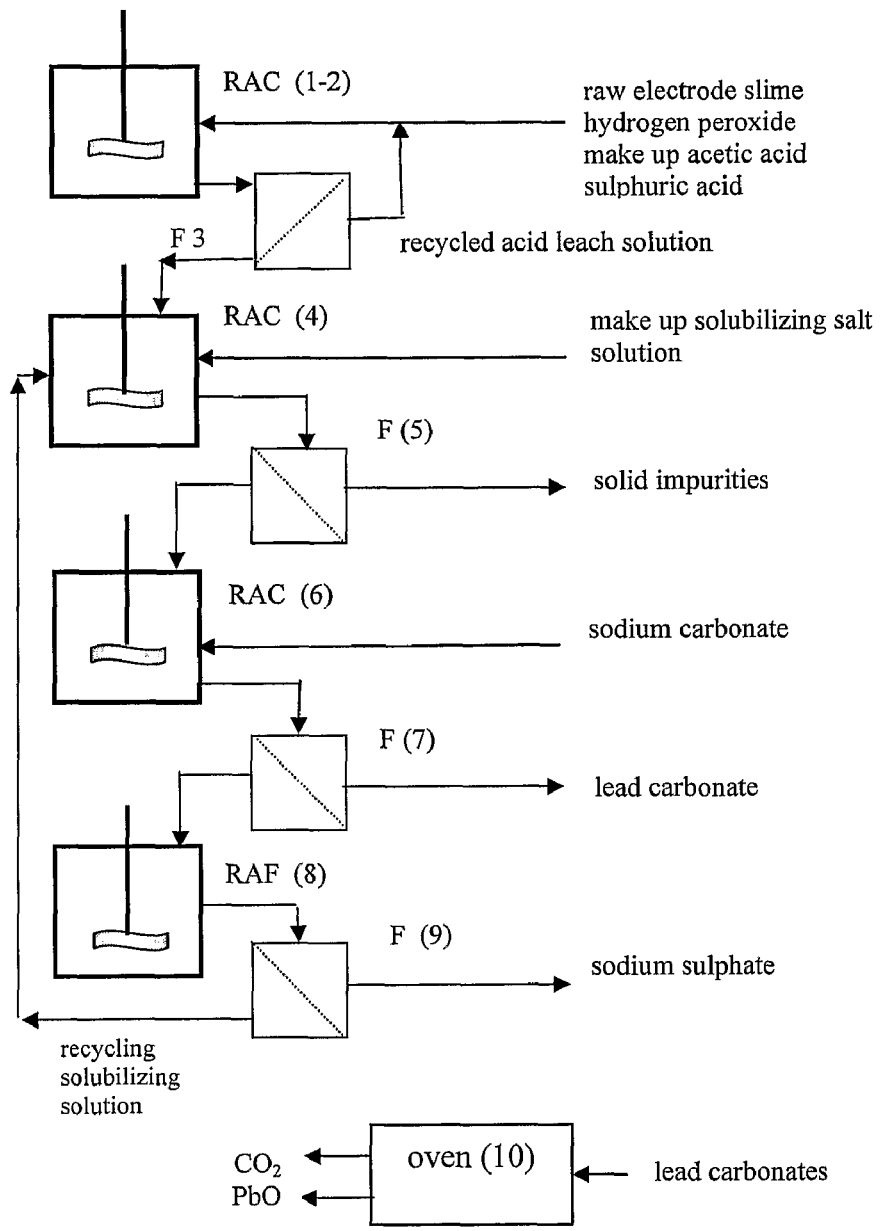
FIG. 2 is a simplified diagram of a plant for recovering lead according to a preferred embodiment.

According to a first embodiment of the method of this invention, particularly suited for treating raw electrode slime recovered from crushed dismissed batteries, but usable with eventual adaptations with a finely ground lead minerals, an acid leaching of the impure starting material with an acid different from sulphuric acid and capable of leaching compounds of Pb(II) (e.g. lead oxide) is first carried out (step 1) and hydrogen peroxide or sulphurous anhydride or a sulphite is added to the acid leach suspension (step 2) in order to reduce suspended lead dioxide (Pb(IV)) to lead oxide (Pb(II)) that dissolves in the acid leaching solution or to form soluble lead sulphate.

For example an aqueous solution of acetic acid with a concentration that may be comprised between about 3% to 85% by weight can be satisfactorily used with dropwise addition of hydrogen peroxide for leaching completely all the lead (II) oxide and lead (IV) oxide contained in an electrode slime maintained suspended in the acid leach solution at a temperature that may be comprised between about 10° C. up to boiling point, stirring the suspension with a pails or turbine mixer in order to favor disgregation of lead dioxide aggregates.

Alternatively, a leaching solution of nitric acid with a concentration that may be comprised between about 2% and 30% by weight, or of fluoboric acid or fluosilicic acid in a concentration that may generally be comprised between about 5% and 40% by weight may be used instead of acetic acid.

The combination of the chosen leaching conditions (type and concentration of the acid, eventual hydrogen peroxide addition, temperature and stirring mode will influence the time needed for completing these steps of dissolution and/or reduction-dissolution of all the lead (II) oxide and lead (IV) oxide contained in the starting material.

Contrarily to the long established approach of prior art processes, according to a fundamental aspect of the process of this invention, a practically complete sulphatation of all the lead causing its precipitation as insoluble lead sulphate that is then separated from a thus clarified solution together with all undissolved impurities present in the impure starting material is carried out (steps 3-4).

The sulphuric acid used for this step should preferably have a high concentration in order not to excessively dilute the acid leach solution. The sulphuric acid may be introduced in a stoichiometric amount or slightly above it on the basis of an estimated content of dissolved lead in the suspension.

Thereafter, a selective dissolution of lead sulphate in respect to the other undissolved impurities separated from the acid leach solution is performed by suspending the separated solid fraction in an aqueous solution of an acetate or other suitable salt (step 5).

With the method of this invention a clear solution in which is present lead sulphate as the only dissolved salt other than the salt employed for making the solubilizing solution is obtained.

The subsequent carbonation reaction of the clear solution containing lead sulphate, by adding to the solution a carbonate of sodium or of potassium or of ammonium as commonly used for such a reaction (step 7) causes the selective precipitation of lead carbonate and of lead oxycarbonate because these salts have a solubility that is much lower than that of lead sulphate.

Once the reaction is complete, the precipitated lead carbonates are separated by filtration from the solution while sulphate of the cation of the carbonate salt used for precipitating the lead generally as a mixture of lead carbonate and of lead oxycarbonate remains in the solution.

The clear solution containing the sulphate of the cation of the carbonate salt employed, can be integrally recycled to the step of selective dissolution of the lead sulphate (step 5) of the process, for as long as the content of sulphate of the cation of the carbonate salt used does not reach saturation (this limit depending on the type of solution being used for dissolving the lead sulphate). Precipitation of the sulphate salt together with the lead carbonates must be prevented. Therefore, excess sulphate salt must be eventually eliminated from the solution before approaching saturation. This may be easily done by exploiting the different solubilities at different temperatures of the sulphate salt (i.e. of sodium, potassium or ammonium sulphate).

The concentration of the aqueous solubilizing salt solution and the temperature at which dissolving of the lead sulphate in it is carried out are not essential parameters because they simply influence the time necessary for completing the treatment and the quantity of lead sulphate that may be dissolved in the solution. In practice, the solubilizing solution, after precipitation of the dissolved lead as carbonate, is recycled back and therefore when operating with a recycled solution with a declining concentration of acetates, more and more recycles may be necessary to complete dissolution of a given quantity of lead sulphate.

The lead carbonate and/or oxycarbonate that are obtained can be thermally decomposed in a rotating oven at the temperature of 350° C. thus obtaining extremely pure lead oxide (>99.9%) that is perfectly suitable for preparing electrode pastes for new batteries.

It has been found and is an optional accessory aspect of the preset invention that it is possible to make with the lead oxide obtained by the process of this invention an electrode paste that may be employed even days after having been prepared. As a matter of fact, production and storage of lead oxide in the form of a paste reduces safety problems for operators attributable to the pulverulent form of lead oxide. According to an embodiment, the lead oxide is transformed into a paste by mixing 90.8% by weight of lead oxide with 7.49% by weight of water and 1.7% by weight of pure glycerin.

Similar results are obtained by employing as humidifying polar substance instead of glycerin, ethylenic, propylenic or polyethylenic glycol having an average molecular weight comprised between 100 and 2000. The amount of humidifying polar substance to be added, may vary between about 1% and about 3% by weight, the pastosity of the dough that is obtained is substantially the same, the only difference being in the storability of the prepared paste that will be possible for longer and longer time the greater is the quantity of polar substance that is added. These polar substances do not alter the normal functioning of the battery, because they do not interfere with the electrodic processes.

The practice of the process of this invention using as starting material a mineral or a mixture of minerals of lead may be completely similar to the above described process, an essential step being that of converting for as much as possible any different salt or lead present in the mineral to either lead sulphate or to lead oxide form. For example, in case of galena, certainly the most common lead mineral, the mineral must be heated in air, according to common techniques until oxidizing the lead sulphide to sulphate. The other common mineral anglesite does not need prior treatment being itself already constituted by lead sulphate. Of course the mineral(s) should be finely ground for facilitating the contemplated wet process steps.

Herein below several examples are reported solely for illustrating different possible embodiments of the process of this invention without in any manner meaning to exclude other possible embodiments.

Example 1

15 g of recovered dried electrode paste having a lead content, expressed as metal equivalent, of 72% was treated under stirring for 10 minutes with 100 ml aqueous solution of acetic acid at 15% by weight, at the temperature of 50° C. After 10 minutes hydrogen peroxide at 32% by weight has been added dropwise until obtaining a no longer increasing clarification of the suspension.

The stirring of the suspension was maintained for further 35 minutes and thereafter sulphuric acid at 96% by weight was added to the clarified suspension. The hot suspension was then filtered and the recovered solid phase was rinsed with a small quantity of deionized water whilst the recovered limpid solution was found to be practically free of lead and was thereafter employed for acid leaching a fresh 15 grams amount of dried electrode paste at the same treatment conditions.

This sequence of steps was repeated 24 times and the repeatedly recycled acid leach solution did not show any impairment of its effectiveness.

The recovered solid phase was suspended in a solution composed of 60 g of sodium acetate and 100 g of water and kept under stirring for 30 minutes at the temperature of 70° C. Thereafter the suspension was filtered for separating a limpid solution containing lead sulphate in the form of a soluble complex and a solid phase of dark grey color that was recycled to the initial step of acetic acid leach.

The limpid solution containing lead sulphate was stirred at 36° C. adding thereto sodium carbonate until reaching a practically complete precipitation of the lead in the form of lead carbonate and lead oxycarbonate. The suspension was thereafter filtered separating the lead carbonates from the solubilizing solution of sodium acetate now enriched of sodium sulphate that was maintained at the temperature of 36° C. and recycled to the step of dissolution of the lead sulphate as long as the content of sodium sulphate in solution remained below saturation.

At this point, the solution was slowly cooled to 15° C. under slow stirring. A crystalline solid phase constituted by sodium sulphate was recovered by filtering the suspension while the clear solution was recycled to the dissolving step of the lead sulphate.

The filtered lead carbonate and oxycarbonate accurately rinsed with de-ionized water were dried at 110° C. for as long as reaching constancy of weight.

At the end the following mass balance was recorded.

In each 15 g amount of recovered electrode paste used in the experiment, were present 1.2 g of insoluble substances of dark grey color containing metallic lead and extraneous substances such as sand, carbon black, barium sulphate, etc.

The maximum quantity of recoverable lead carbonate was of 13.02 g while the quantity of lead carbonate effectively recovered was of 12.89 g for a recovery yield of 99%.

Chemical analysis of the solid product recovered was constituted exclusively by the double salt of formula $2PbCO_3 \cdot PbO$ and by $PbCO_3$ at 99.99% purity, while the sodium sulphate that was eventually recovered had a purity of about 99.90%.

The following table summarizes relevant conditions, peculiarity and results of the process of the above Example 1 described in detail together with relevant conditions peculiarity and results that were obtained, always using as starting material 15 g of electrode paste of the same lot recovered from crushed dismissed batteries, according to nine different examples of practicing the method of this invention.

| | Acid leach | Solubilizing solution | Temp. ° C. | Stirring min. | Pb recovered as carbonate |
|---|---|---|---|---|---|
| Example 1 | 15% acetic acid at 50° C., 45 min. | Sodium acetate 60 g/100 g $H_2O$ | 70 | 30 | 99.0 |
| Example 2 | 5% nitric acid at 50° C., 30 min. | Sodium acetate 60 g/100 g $H_2O$ | 70 | 30 | 99.89 |
| Example 3 | 10% acetic acid at 70° C., 60 min. | Sodium acetate 60 g/100 g $H_2O$ | 70 | 60 | 99.78 |
| Example 4 | 50% acetic acid at 35° C., 180 min. | Sodium acetate 60 g/100 g $H_2O$ | 70 | 180 | 98.84 |

-continued

| | Acid leach | Solubilizing solution | Temp. °C. | Stirring min. | Pb recovered as carbonate |
|---|---|---|---|---|---|
| Example 5 | 70% acetic acid at 35° C., 180 min. | Ammonium acetate 60 g/100 g $H_2O$ | 50 | 180 | 98.51 |
| Example 6 | 5% acetic acid at 50° C., 120 min. | Sodium acetate 60 g/100 g $H_2O$ | 50 | 30 | 94.6 |
| Example 7 | 5% nitric acid at 70° C., 30 min. | Sodium acetate 80 g/100 g $H_2O$ | 70 | 120 | 99.99 |
| Example 8 | 5% fluoboric acid at 50° C., 30 min. | Sodium acetate 60 g/100 g $H_2O$ | 70 | 30 | 88.39 |
| Example 9 | 5% fluosilicic acid at 50° C., 30 min. | Sodium acetate 60 g/100 g $H_2O$ | 70 | 30 | 86.37 |
| Example 10 | 15% acetic acid at 50° C., 30 min. | Mono-ethanolamine acetate 70 g/50 g $H_2O$ | 70 | 30 | 19.65 |

Example 11

5 g of lead carbonate salts mixture obtained according to the process described in Example 1, were heated in oven up to 350° C. and maintained at this temperature for 60 minutes.

At the end of the treatment 4.17 g of a pulverulent substance of yellow color were recovered. The yellow substance proved to be constituted by α lead oxide of purity above 99.99%.

Example 12

5 g of lead carbonate salts mixture obtained according to the process described in Example 7, were heated in oven up to 450° C. and maintained at this temperature for 60 minutes.

At the end of this treatment 4.17 g of a pulverulent substance having an orange color were recovered. The substance proved to be constituted by β lead oxide of purity greater than 99.99%.

To 3 g of lead oxide were added water and pure glycerin in order to obtain a mixture having the following composition by weight:
lead oxide 91%, water 7%, glycerin 2%.

The mixture was accurately mixed obtaining a paste with the consistency of a stucco. The paste was placed in a sealed container and after 12 hours its consistency was verified. The paste was found to practically retain the same consistency for as long as 72 hours from its preparation.

Example 13

1000 g of lead carbonate mixture obtained according to the processing choices of Example 2, was treated in an externally heated, rotating tubular oven.

The temperature inside the oven was maintained at 350° C. for one hour and during the treatment a stream of 30 liters of pure anhydrous nitrogen was passed through the oven.

The gases exiting the oven were conveyed to a condenser and cooled down to the temperature of −80° C. in order to liquefy the carbon dioxide released during the thermal decomposition of the carbonates. At the end of the test, 160 g of extremely pure carbon dioxide were recovered, usable even for gassing beverages.

The invention claimed is:

1. A process for recovering the lead content of an impure starting material in the form of electrode paste or slime from discarded lead batteries and/or of a lead mineral in the form of high purity lead carbonate and/or lead oxycarbonate, comprising dissolving lead oxide and other soluble substance in an acid leaching solution, characterized in that the leaching acid is selected from the group consisting of acetic acid, nitric acid, fluoboric acid and fluosilicic acid and the process comprises the following steps:
   a) adding sulphuric acid to an acid leaching suspension of an impure starting material to convert dissolved lead compounds to insoluble lead sulphate;
   b) separating a solid phase comprising lead sulphate and undissolved substances from the acid leaching solution;
   c) selectively dissolving lead sulphate contained in said separated solid phase in an aqueous solution of at least a solubilizing compound selected from the group consisting of sodium acetate, ammonium acetate, potassium acetate, urea acetate, mono-, di- or tri-ethanolamine acetate, dimethyl, ethyl or propyl amine, water soluble amides and sodium thiosulphate;
   d) separating a solution containing dissolved lead sulphate from a solid phase residue including undissolved impurities;
   e) adding to the separated solution of lead sulphate a sodium or potassium or ammonium carbonate to form insoluble lead carbonate and/or lead oxycarbonate and a soluble sulphate of the same cation of the added carbonate salt;
   f) separating precipitated carbonate and/or oxycarbonate of lead from the dissolving solution containing sulphate of the cation of said solubilizing compound.

2. The process of claim 1, characterized in that it comprises gradually cooling or gradually heating the separated dissolving solution of step f) to selectively precipitate the sulphate of the cation of the solubilizing compound, and to separate the sulphate of the cation of the solubilizing compound from a limpid dissolving solution that is recycled to step c), in order to maintain the sulphate concentration below saturation.

3. The process of claim 1, wherein the starting material is recovered electrode slime containing lead dioxide insoluble in the acid leaching solution and wherein the process further comprises adding a compound selected from the group consisting of hydrogen peroxide, sulphurous anhydride and sulphites to the acid leaching suspension to reduce said lead dioxide content.

4. The process of claim 3, wherein said recovered electrode slime is leached in a solution of at least an acid selected from the group consisting of acetic acid, nitric acid, fluoboric acid and fluosilicic acid with dropwise addition of a reagent selected from the group consisting of hydrogen peroxide, sulphurous anhydride and sulphites to reduce lead dioxide to lead oxide which dissolves in the acid leach solution or to convert lead dioxide to lead sulphate.

5. The process of claim 1, wherein the acid leaching of the impure starting material is carried out in an aqueous solution of acetic acid having a concentration between 3% and 85% by weight and at a temperature between 10° C. and 100° C.

6. The process of claim 1, wherein the acid leaching of the impure starting material is carried out in an aqueous solution of nitric acid having a concentration between 2% and 30% by weight at a temperature between 10° C. and 100° C.

7. The process of claim 1, wherein the acid leaching of the impure starting material is carried in an aqueous solution of fluoboric acid having a concentration between 5% and 40% by weight at a temperature between 10° C. and 100° C.

8. The process of claim 1, wherein the acid leaching of the impure starting material is carried in an aqueous solution of fluosilicic acid having a concentration between 5% and 40% by weight at a temperature between 10° C. and 100° C.

9. The process of claim 1, wherein to a stirred acid leaching suspension of insoluble substances of the impure starting material is added dropwise hydrogen peroxide or a sulphite solution until reaching a limited degree of clarification.

10. The process of claim 1, wherein through a stirred acid leach suspension of insoluble substances of the impure starting material is bubbled sulphurous anhydride until reaching a limited degree of clarification.

11. The process of claim 1, wherein sulphatation of dissolved lead is carried out by adding to the acid leach suspension sulphuric acid in a stoichiometric amount or slightly above on the basis of an estimated content of dissolved lead in the suspension.

12. The process of claim 1, wherein the solid phase is separated by filtering an acid leaching suspension and a separated limpid acid leaching solution is recycled to the leaching step of the impure starting material until the effectiveness of the recycled acid leaching solution is exhausted.

13. The process of claim 1, wherein the selective dissolution of the lead sulphate is carried out by suspending said separated solid phase in an aqueous solution of sodium acetate having a concentration between 40 g and 100 g of salt in 100 g of water at a temperature between 30° C. and 100° C., for a stirring time between 10 and 180 minutes.

14. The process of claim 1, wherein selective dissolution of the lead sulphate is carried out by suspending said separated solid phase in an aqueous solution of ammonium acetate having a concentration between 80 g and 100 g of salt in 100 g of water at a temperature between 30° C. and 80° C., for a stirring time between 60 and 180 minutes.

15. The process of claim 1, wherein selective dissolution of the lead sulphate is carried out by suspending said separated solid phase in an aqueous solution of mono-ethanolamine acetate having a concentration comprised between 90 g and 150 g of salt in 100 g of water at a temperature between 30° C. and 90° C., for a stirring time between 60 and 180 minutes.

16. A plant for recovering the lead content of impure electrode paste or slime from discarded lead batteries and/or of a lead mineral in the form of high purity lead carbonate and/or lead oxycarbonate according to the process of claim 1 comprising:
a) a first reactor having stirring and heating means to contain said impure paste, slim and/or lead mineral starting material, a leaching solution of an acid different from sulphuric acid to form soluble lead compounds, means for controlled addition of a reagent selected from the group consisting of hydrogen peroxide, sodium sulphite and sulphurous anhydride, and means for controlled addition of sulphuric acid to precipitate the dissolved lead as insoluble lead sulphate;
b) a first solid-liquid separator to separate a solid phase comprising the precipitated lead sulphate and insoluble substances contained in the impure starting material from a limpid acid leaching solution and means to recycle the limpid acid leaching solution to said first reactor;
c) a second reactor having stirring and heating means to hold an aqueous solution of a solubilizing salt to selectively dissolve the lead sulphate portion of said separated solid phase suspended in the solution;
d) a second solid-liquid separator to separate a solid phase comprising said insoluble substances of the impure starting material from a limpid aqueous solution of solubilizing salt containing the lead sulphate dissolved in said second seperator;
e) a third reactor having stirring and heating means to hold said lead sulphate containing limpid aqueous solution separated in said second separator, means to add to the lead sulphate solution a carbonate of the cation of said solubilizing salt to precipitate insoluble lead carbonates and to form sulphate of the cation of the solubilizing salt;
f) a third solid-liquid separator to separate said lead carbonate precipitated in said third reactor from a limpid solution containing sulphate of the cation of the solubilizing salt;
g) a fourth reactor having stirring means and means for controlled cooling or controlled heating of the limpid solution separated in said third separator to crystallize sulphate of the cation of the solubilizing salt contained in the separated limpid solution;
h) a fourth solid-liquid separator to separate said crystallized sulphate of the cation of the solubilizing salt from liquors formed in said fourth reactor and means to recycle said liquors formed in said fourth reactor to said second reactor.

17. The plant of claim 16, further comprising an externally heated oven in which said separated lead carbonate is quantitatively decomposed to lead oxide and carbon dioxide both recovered with a purity equal or greater of 99.9%.

18. A process for recovering the lead content of a lead mineral in the form of high purity lead carbonate and/or lead oxycarbonate, wherein the lead mineral is finely ground galena, roasted in air to convert lead sulphide to lead sulphate, comprising dissolving lead oxide and other soluble substance in an acid leaching solution, characterized in that the leaching acid is selected from the group consisting of acetic acid, nitric acid, fluoboric acid and fluosilicic acid and the process comprises the following:
a) selectively dissolving lead sulphate contained in a separated solid phase in an aqueous solution of at least a solubilizing compound selected from the group consisting of sodium acetate, ammonium acetate, potassium acetate, urea acetate, mono-, di- or tri-ethanolamine acetate, dimethyl, ethyl or propyl amine, water soluble amides and sodium thiosulphate;
b) separating a solution containing dissolved lead sulphate from a solid phase residue including undissolved impurities;
c) adding to the separated solution of lead sulphate a sodium or potassium or ammonium carbonate to form insoluble lead carbonate and/or and lead oxycarbonate and a soluble sulphate of the same cation of the added carbonate salt; and
d) separating precipitated carbonate and/or oxycarbonate of lead from the dissolving solution containing sulphate of the cation of said solubilizing compound.

* * * * *